(12) United States Patent
Mears

(10) Patent No.: US 8,475,173 B2
(45) Date of Patent: *Jul. 2, 2013

(54) SYSTEM AND METHOD FOR EDUCATING USING MULTIMEDIA INTERFACE

(76) Inventor: Vernon Mears, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,471

(22) Filed: Apr. 12, 2010

(65) Prior Publication Data

US 2010/0261148 A1  Oct. 14, 2010

Related U.S. Application Data

(63) Continuation of application No. 10/887,063, filed on Jul. 8, 2004, now Pat. No. 7,695,284.

(60) Provisional application No. 60/492,476, filed on Aug. 4, 2003, provisional application No. 60/486,583, filed on Jul. 11, 2003.

(51) Int. Cl.
 *G09B 3/00* (2006.01)

(52) U.S. Cl.
 USPC .......................................... 434/322; 434/308

(58) Field of Classification Search
 USPC ................... 434/308, 322–323, 350; 725/25, 725/91; 84/1, 601; 700/94
 See application file for complete search history.

(56) References Cited

U.S. PATENT DOCUMENTS

| | | | | | |
|---|---|---|---|---|---|
| 5,293,358 | A | * | 3/1994 | Krause | 369/2 |
| 7,036,145 | B1 | * | 4/2006 | Murphy et al. | 726/21 |
| 7,191,023 | B2 | * | 3/2007 | Williams | 700/94 |
| 2003/0077559 | A1 | * | 4/2003 | Braunberger et al. | 434/322 |

* cited by examiner

*Primary Examiner* — Timothy A Musselman
(74) *Attorney, Agent, or Firm* — Garcia Zamor IP Law; Ruy M. Garcia-Zamor

(57) ABSTRACT

A method of educating using a virtual workstation. The method includes the steps of: providing the virtual workstation; allowing a person to access the virtual workstation to generate multimedia product; and requiring that the person complete at least one educational project to continue accessing the virtual workstation to generate multimedia product.

19 Claims, 7 Drawing Sheets

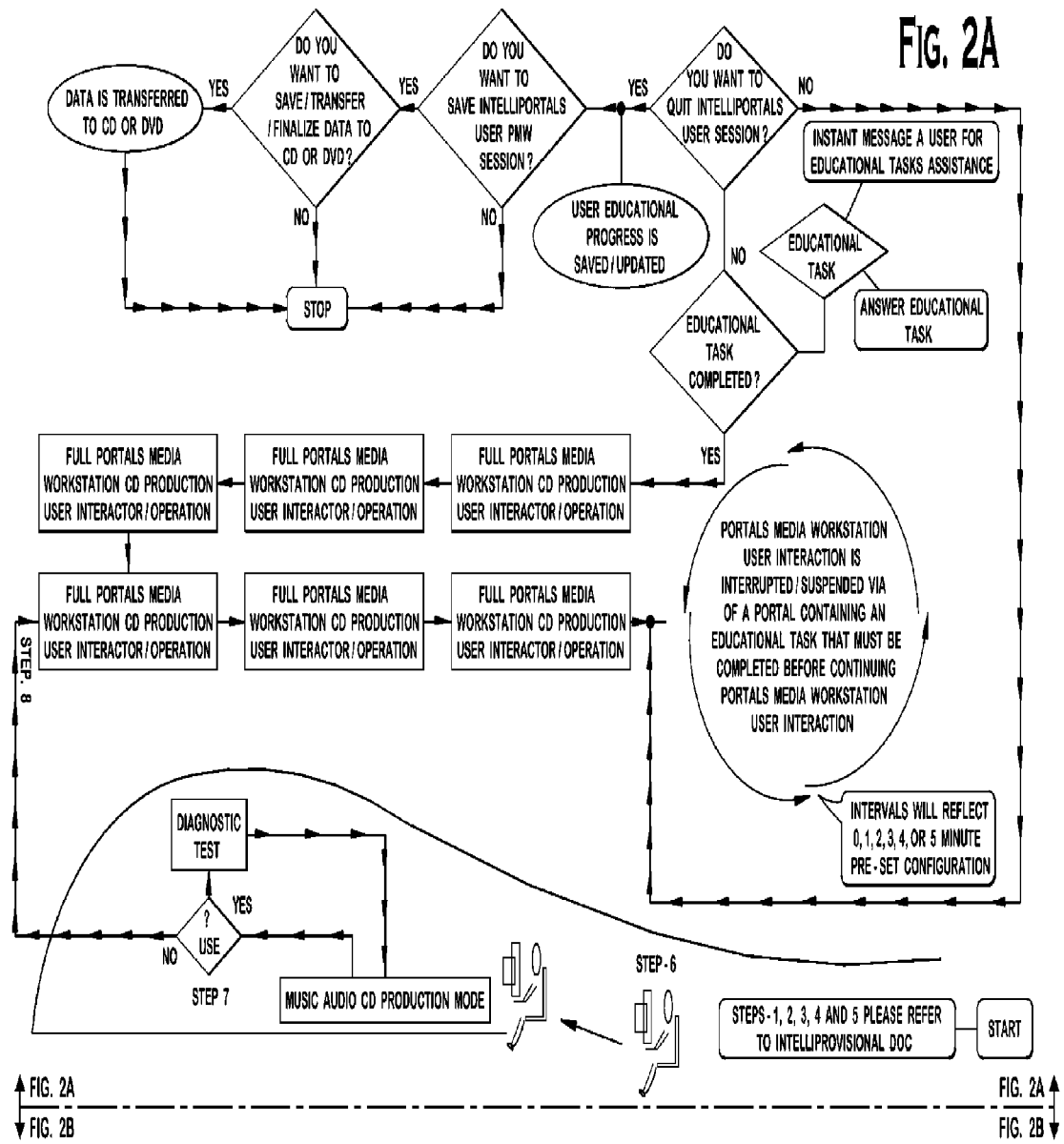

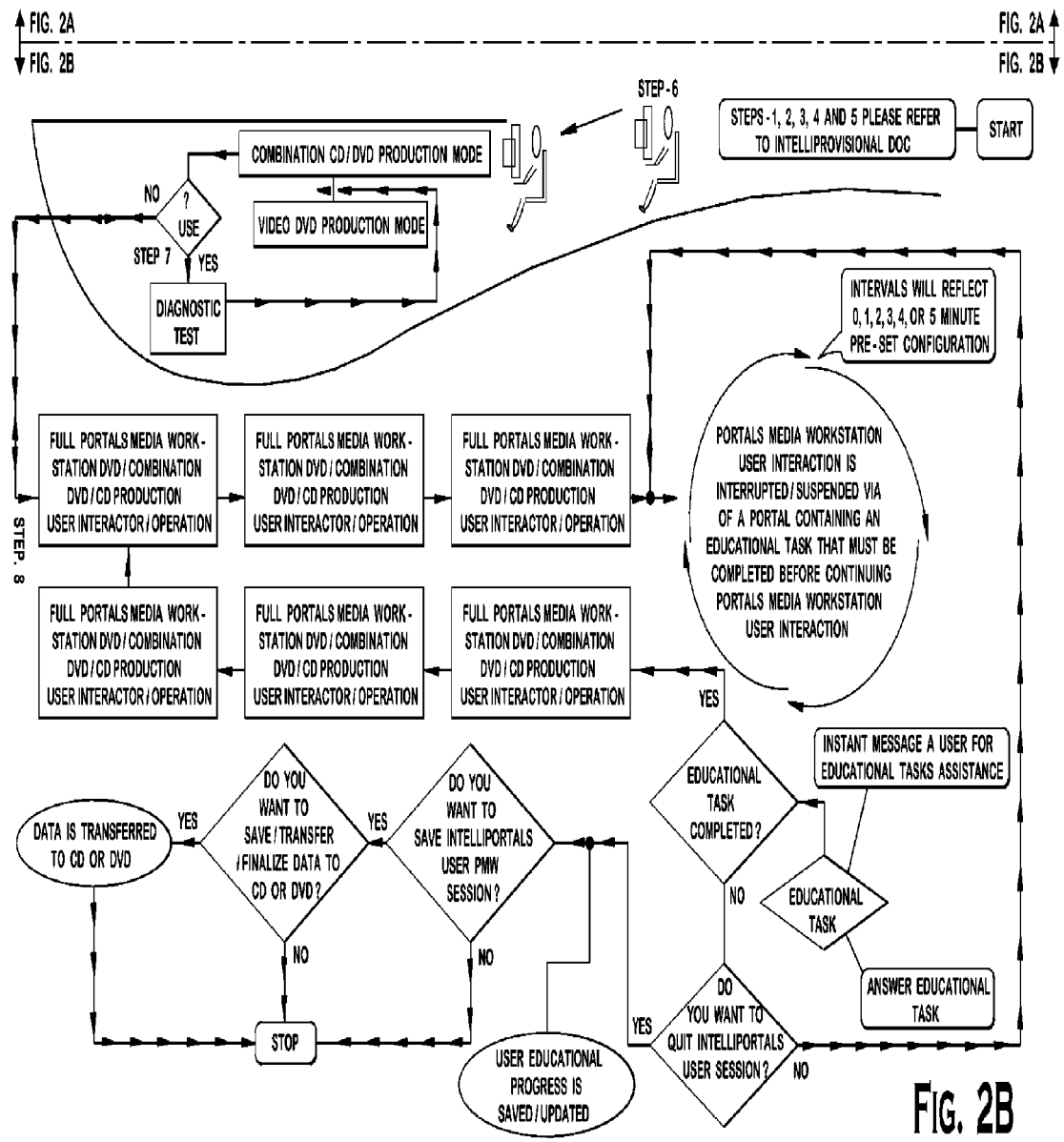

SYSTEM AND METHOD FOR EDUCATING USING MULTIMEDIA INTERFACE

CROSS REFERENCE TO RELATED APPLICATIONS

This application claims priority to and benefit of: (1) U.S. Provisional Patent Application 60/486,583, filed Jul. 11, 2003, entitled "System and Method for Educating Using Multimedia Interface", invented by Vernon Mears; (2) U.S. Provisional Patent Application 60/492,476, filed Aug. 4, 2003, entitled, "System and Method for Educating Using Multimedia Interface"; and (3) U.S. patent application Ser. No. 10/887,063, filed Jul. 8, 2004, invented by Vernon Mears; each of the above identified applications is hereby incorporated by reference herein in their entirety as if fully set forth.

BACKGROUND

This invention is directed to education in general and, more specifically, to using multimedia tools to motivate and educate individuals.

Increasing numbers of students are losing their motivation to learn and their academic interest due to the inability of conventional educational methods to inspire and motivate individuals. This decrease in motivation and interest is demonstrated by increasing: inattentiveness, truancy, disruptive classroom behavior, dropout rates, low standardized and regular test scores.

The importance of conforming to peer pressures further exacerbates the above problems and causes one student's disruptive behavior to be replicated by students who would otherwise desire to learn. The continuing problems have resulted in a reexamination of the strategies used by educational institutions.

Several educational companies base their educational initiatives on conventional multiple choice educational computer software. However, such programs rarely capture student attention. Consequently, many of the students enrolled in these initiatives perform even worse than prior to entering the educational initiative.

In today's media intensive environment, many forces are constantly competing for the attention of students. One of the largest distractions is the entertainment industry which often portrays becoming an entertainer as a glamorous and lucrative career to pursue. Some music producers have observed that three fourths of their clients were of school age and had dropped out of school to pursue entertainment related careers. This only demonstrates a small amount of the effect that the entertainment industry has on school age children.

The entertainment industry focuses it's marketing to youths ages eight to nineteen of which about ninety eight percent are enrolled in school. In many economically distressed areas, children find a "safe haven" from their unpleasant surroundings in music and entertainment. This can lead to music and entertainment becoming the majority focus in their lives. As such, it is no surprise that rapidly growing numbers of school-age youths "drop out" each year to pursue entertainment careers. This premature termination of their education results in the majority of these children never obtaining a productive place in society. Even worse, a significant number end up being exploited financially and/or sexually by unscrupulous talent agents, producers, business managers, company executives, and con artists.

This problem is not unique to any one area of the country. The Philadelphia public schools appear to be steadily loosing the battle for the hearts and minds of its students. This is best demonstrated by the establishment of nearly three dozen charter schools over the past four years despite a decline in the Philadelphia population.

What is needed is a new exciting educational method that can use students interest in entertainment to further their educations; that uses multi-media software to interest students; and that can increase the connectivity between students and neighborhood schools.

SUMMARY

Briefly speaking, one embodiment of the present invention is directed to a method of educating using a virtual workstation. The method includes the steps of: providing the virtual workstation; allowing a person to access the virtual workstation to generate multimedia product; and requiring that the person complete at least one educational project to continue accessing the virtual workstation to generate multimedia product.

A separate embodiment of the present invention is directed to a method of educating a person. The method including the steps of: providing a workstation configured to access multimedia tools; testing the person to determine a current educational level; allowing the person to access the multimedia tools via the workstation to generate multimedia product; interrupting the person's access to the multimedia tools at a predetermined interval; providing at least one educational project that must be completed by the person to reestablish access to the multimedia tools; evaluating the completed educational project; storing the evaluation in a personal profile corresponding to the person; and using the personal profile to select the next educational project to be assigned during an interruption of the person's access to the multimedia tools.

A separate embodiment of the present invention is directed to a method of educating a person, the method being performed by an apparatus having a workstation configured to access multimedia tools. The method including the steps of: allowing input by the person to access the multimedia tools via the workstation to generate multimedia product; allowing input by the person to select whether to access the multimedia tools via a video studio graphical interface or a music studio graphical user interface; automatically interrupting the person's access to the multimedia tools at a predetermined interval; providing at least one educational project via the workstation that must be completed by the person to reestablish access to the multimedia tools; evaluating the completed educational project based on accuracy and/or completion time; and storing the evaluation in a personal profile corresponding to the person.

BRIEF DESCRIPTION OF THE DRAWINGS

The foregoing summary, as well as the following detailed description of the preferred embodiment of the present invention will be better understood when read in conjunction with the appended drawings. For purposes of illustrating the invention, there is shown in the drawings an embodiment which is presently preferred. It is understood, however, that the invention is not limited to the precise arrangement and instrumentality shown. In the drawings:

FIG. 2 is a flow chart illustrating one embodiment of the method of educating of the present invention.

DETAILED DESCRIPTION OF THE PREFERRED EMBODIMENTS

Certain terminology is used in the following description for convenience only and is not limiting. The term "storage media," as used in the claims and in corresponding portions of the specification, means "any one of a Compact Disc, a Digital Video Disc, a removable hard drive, a hard drive, MPEG storage card, or the like." The term student is used throughout the specification for simplicity, but is defined as including any user interested in learning regardless of whether the present invention is being used outside of the traditional student context in which a person is enrolled in a teaching institution. Additionally, the term virtual educator is used below to refer to an artificial intelligence that is preferably built into the operating software used with the present invention. However, those of ordinary skill in the art will appreciate from this disclosure that various steps described as being performed by the virtual educator can be performed by a person or teacher without departing from the scope of the present invention. The words "a" and "one" are defined as including one or more of the referenced item unless specifically stated otherwise. The terminology includes the words above specifically mentioned, derivatives thereof, and words of similar import.

Figure 1:
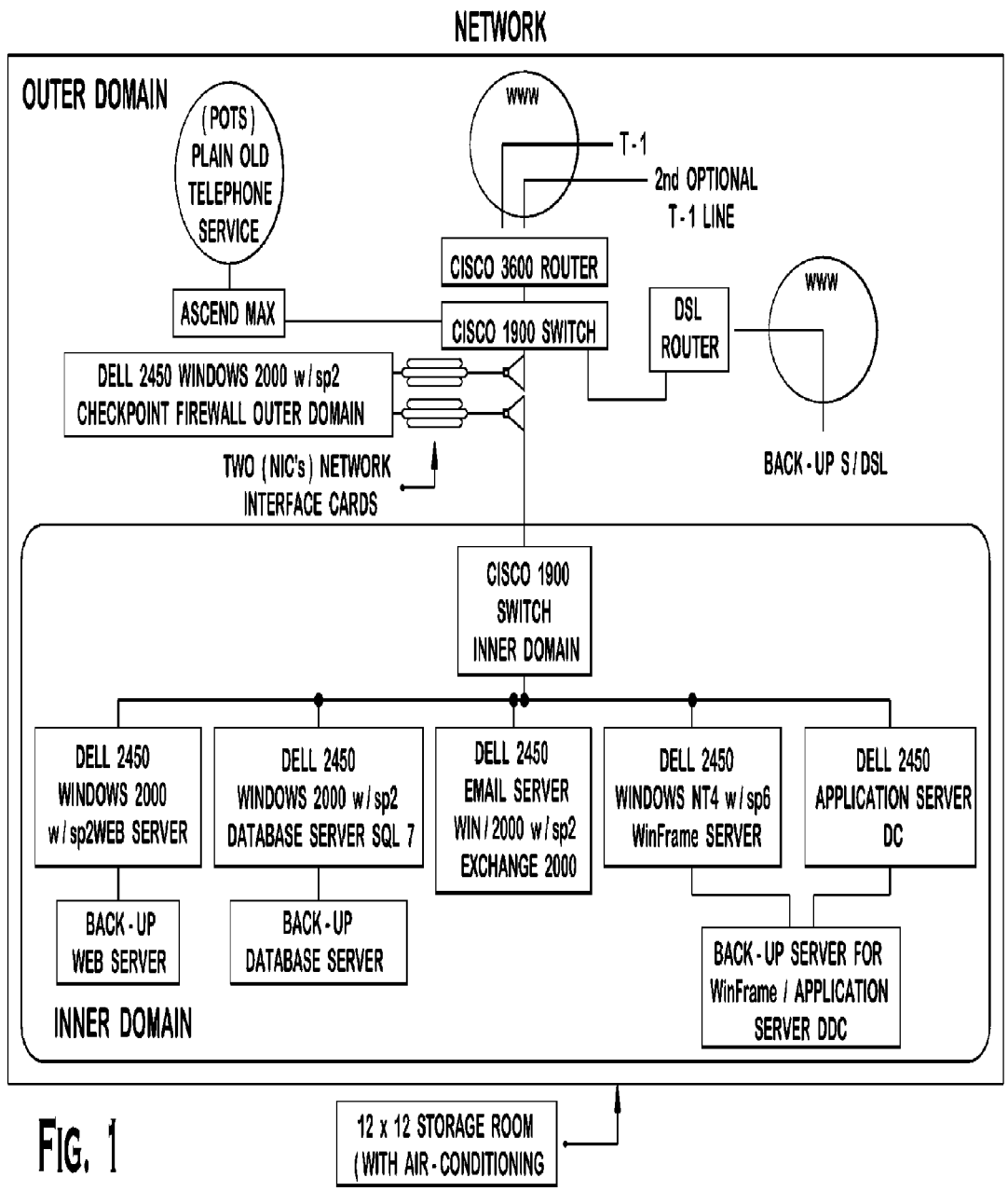
FIG. 1 is a schematic view of a preferred system configuration for use with the method of educating according to the present invention.
Figure 3A:
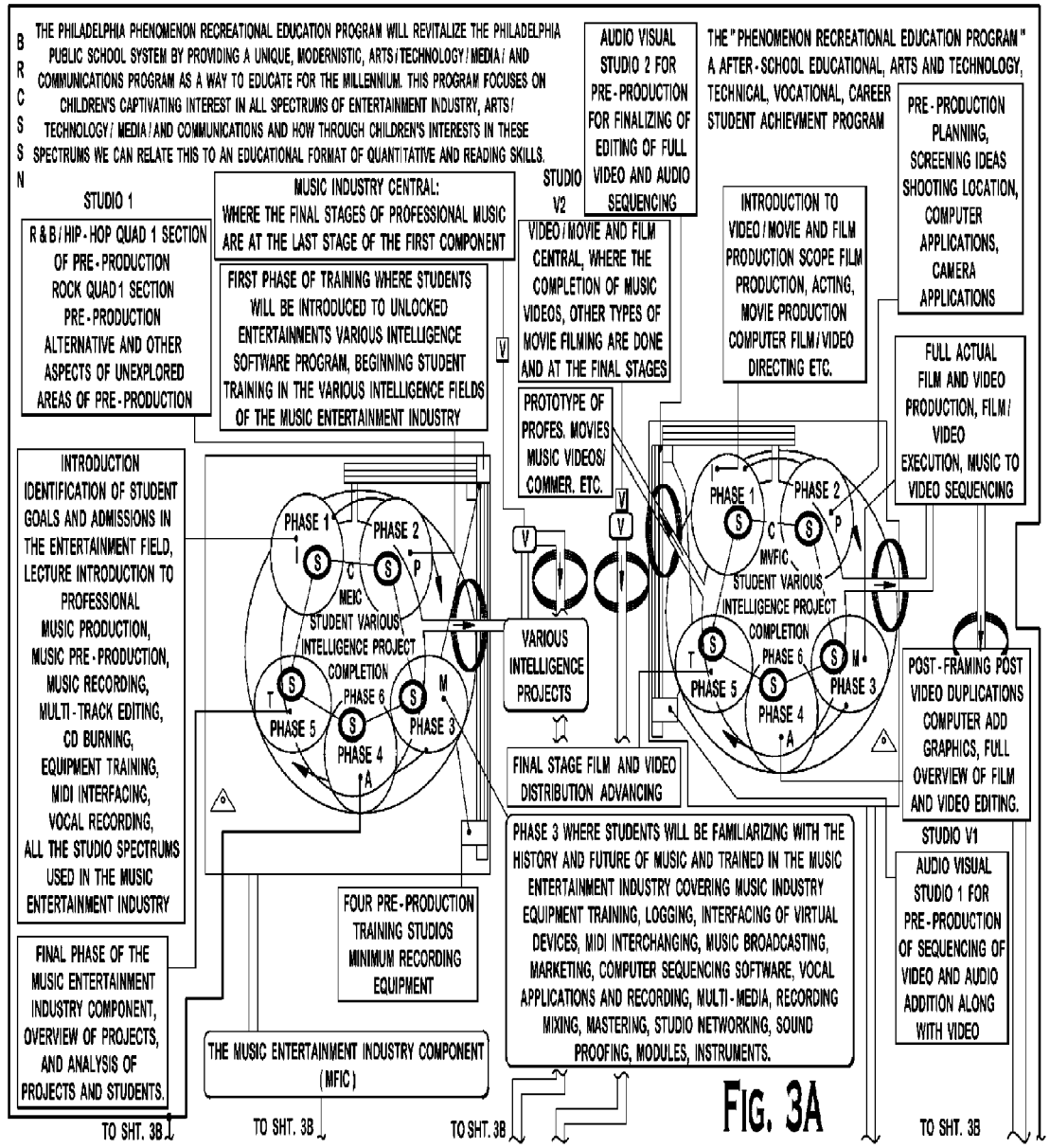
FIG. 3 is a schematic drawing illustrating one way that the method of educating using a multimedia interface can be integrated into a charity so as to be self funding and thus, maintainable in financially disadvantaged schools.
Figure 3B:
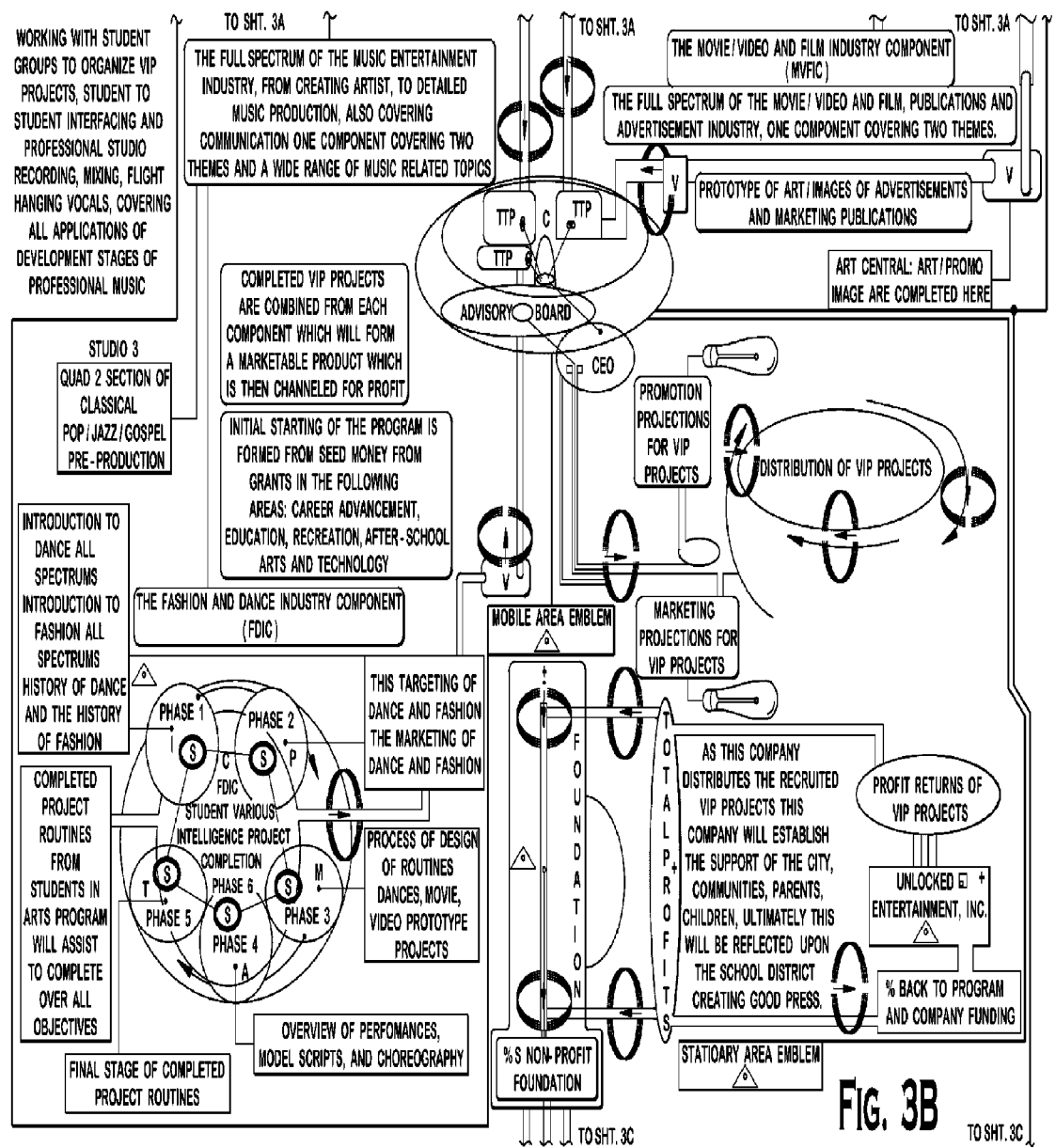
Figure 3C:
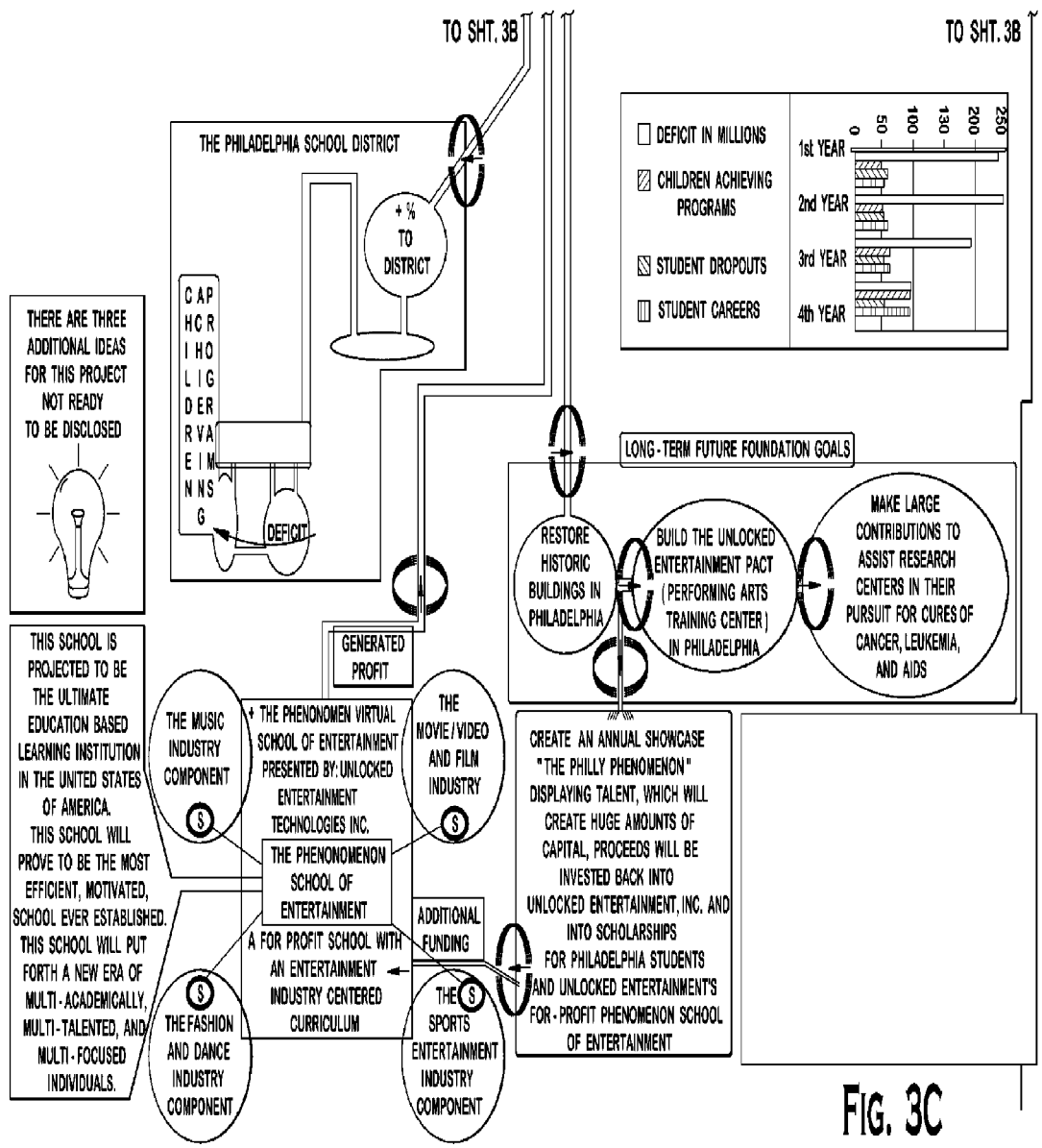
Figure 3D:
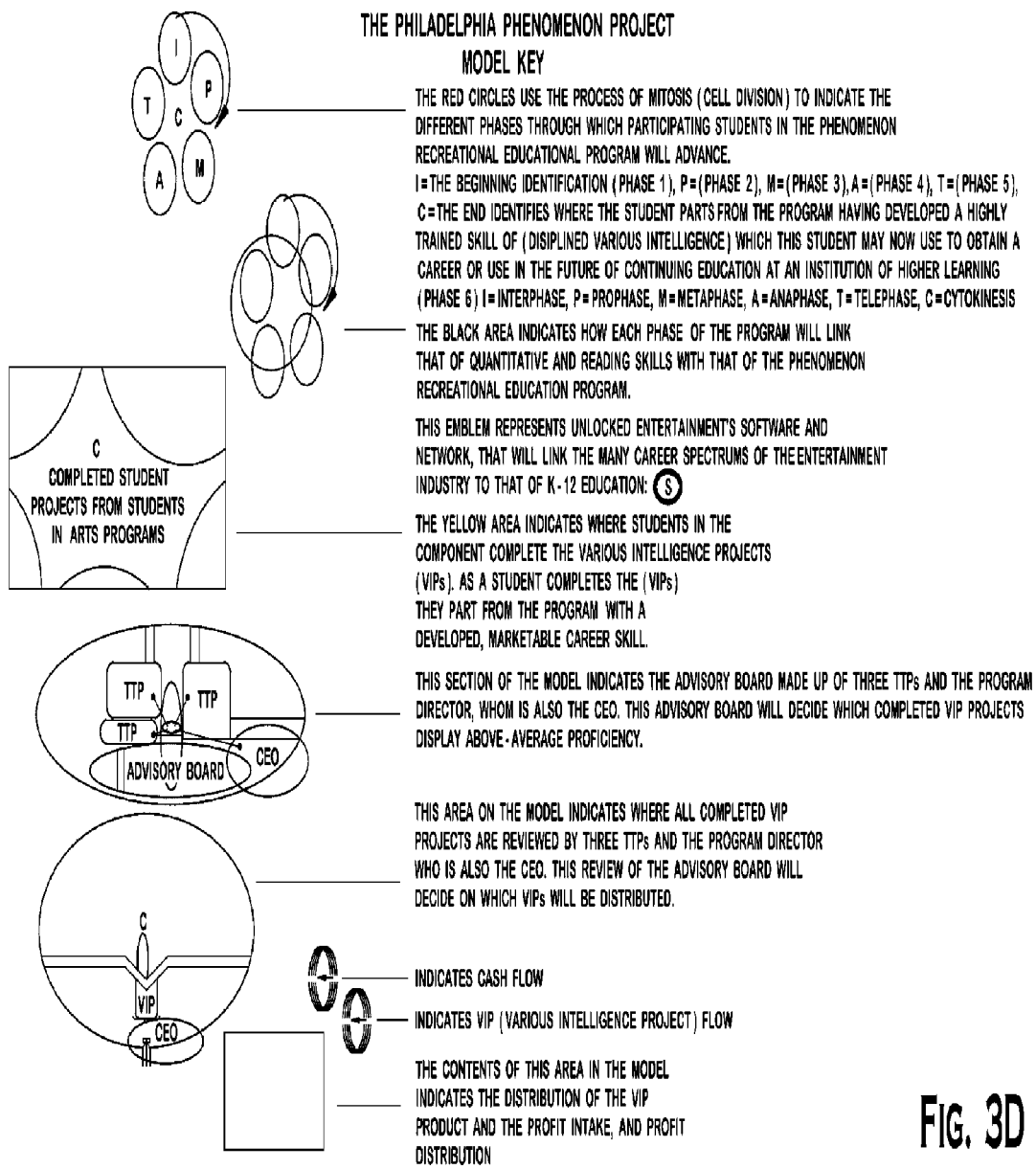

Referring to FIGS. 1-3, a method and system for educating using a multimedia interface is shown. Briefly speaking, the present invention integrates artificial intelligence education with multimedia software to link students to a virtual entertainment production workstation (hereinafter referred to as a "virtual workstation"). The virtual workstation may be used to produce, create, and/or edit multimedia audio and/or video data (hereinafter referred to as "multimedia product"). The multimedia product can be edited, saved, and/or burned onto a storage media to complete the production of an entertainment product that can be, depending on the creativity of the student, of professional caliber. However, for the student to maintain access to the virtual workstation, the student will have to complete various educational projects (hereinafter referred to as "projects") that will interrupt access to the virtual workstation as described below. This results in students being motivated to complete projects which further their education while learning to produce multimedia product.

While the preferred method of the present invention is implemented using software, those of ordinary skill in the art will appreciate that the projects can be provided by teachers or the like without departing from the present invention. The preferred software for implementing the present invention incorporates modules that will be described below. Those of ordinary skill in the art will appreciate that any sub combination of modules can be used without departing from the present invention.

Referring to FIG. 1, the system of the present invention preferably includes a plurality of servers and back-up servers. The system can be remotely accessed via a DSL connection using network interface cards, an Ethernet connection, a cable modem, a broadband connection, a satellite connection, a wireless connection, or the like.

When a student is accessing the virtual workstation, that access will preferably be interrupted or suspended at predetermined intervals. A student may become aware of a suspended session by the opening of a window or portal in virtual workstation interface (hereinafter referred to as the "interface"). The window provides a student with a project that preferably must be completed before the student can continue accessing the virtual workstation to continue developing multimedia product. The projects are preferably provided by an artificial intelligence module (hereinafter referred to as the "virtual educator"). As detailed above, the assignment of projects (or any other steps of the present invention) can be performed by a person without departing from the scope of the present invention. Additionally, the method of the present invention can be operated by a conventional program that uses present parameters to assign programs and collect statistics without departing from the scope of the present invention. Although, it is preferred to have an artificially intelligent program, a conventional program that interacts with a database, monitors performance, and stores data for determining the next project is more than sufficient for practicing the present invention. In fact, the steps preferably performed by the artificially intelligent program could be performed by a person administrating the method of the present invention. The virtual workstation has many resources and capacities that are available to users, such as: tool menus, plug-in module menus, control buttons, midi instrument connectors, and virtual instruments that facilitate the production of musical multimedia product.

The predetermined intervals between the suspended sessions and the provision of projects to a user can be set using various parameters, such as: at a regular interval; at varying intervals depending on the difficulty of the projects that are successfully completed; at varying intervals depending on the length of time the virtual workstation is accessed; and depending on the grades of the student operating the virtual workstation. When criterion that is external to the program, such as class room grades or behavior, is used to set the predetermined interval, the appropriate data is preferably entered into the virtual workstation by an administrator.

The virtual educator preferably provides projects that contain a mixture of open ended, multiple choice, reading comprehension, writing, and/or mathematical problems. However, any project format can be used that is educational without departing from the present invention.

In addition to generating and editing musical and graphical data, the virtual workstation can receive, generate, and edit video data. This allows students to prepare multimedia product that relates to dance, fashion, film, movies, and/or music. When this data is produced, developed and saved to storage media, it can be later accessed for editing. If the multimedia product is finalized, then the data can preferably be burned, copied, or transferred to additional storage media.

When a user signs onto the virtual workstation for the first time, the virtual educator preferably presents the student with diagnostic tests to complete that involve reading, writing, and mathematical problems. The virtual educator preferably stores the results of the diagnostic tests on the system for use in constructing projects and in monitoring performance. After taking the initial diagnostic tests, students can re log in to a virtual workstation without having to retake the diagnostic tests.

The virtual educator preferably uses the initial diagnostic tests to pinpoint a student's educational weaknesses. This allows the virtual educator to tailor projects to the student that are designed to improve the student's skills in those areas of weakness.

It is preferred, but not necessary, that teachers monitor students during the initial diagnostic tests to ensure that a student is taking the diagnostic test seriously rather than purposely trying to do poorly so as to be later provided with simpler projects. One feature of the virtual educator is to monitor the time it takes students to complete projects. If the time for completion falls below a certain level, the virtual educator preferably increases the difficulty of the projects. This allows the virtual educator to maintain a ratio between time spent accessing the virtual workstation to produce multimedia product and the amount of time spent working on educational materials.

Additionally, when a student performs above a predetermined level, the virtual educator preferably emails school faculty to alert them to the student's potential. This can be used as a method to determine when a student should be placed in an honors course or the like.

The system of the present invention preferably creates a profile for each user, which includes age, grade, diagnostic test results, and/or completed project results. The user profile is preferably stored in a secure database. When the virtual educator presents relevant projects to a student in accordance with their user profile, the software of the present invention accesses databases used for standardized testing to provide age appropriate problems. The educational databases are maintained and upgraded to ensure a high level of intellectual challenge for students.

Once a project is completed the virtual educator preferably assesses the project for accuracy, difficulty, and time to complete. It is preferable that the virtual educator will continue to provide projects for the student as long as the student is engaged with the virtual workstation.

The virtual workstation will preferably include at least two modes of operation that can transform the interface into either: (1) an entertainment multi-track digital music production studio (hereinafter referred to as a "music studio"); or a digital video production studio (hereinafter referred to as a "video studio"). The interface can be operated in either mode and can be switched between the two as desired. By selecting the music studio mode, the students computer is turned into a virtual entertainment audio music production studio. The music studio provides the student with the capability to process sound, produce original music (using drum loops and/or music editing), and/or record audio tracks or vocals that can incorporate advanced studio effects. This allows students to compose multimedia product that encompass the full range of tools normally available in a professional music recording studio. When the multimedia product is completed, the student can store the composition on the storage media of choice.

When the interface is set to video studio, the student's computer is essentially "transformed" into a professional caliber video production studio. As such, the student can process, edit, loop, record, add/delete frames from, and add audio (created using the music studio) to video data to create original multimedia product. The video studio and music studio provide students with the ability to use the virtual workstation production tools, action menus, music-sequencer/editor, video-sequencer/editor, virtual music instruments, drum machine, complete audio editor, and complete video/audio editor to create, arrange, edit, save, music audio, audio, video, and video audio digital data. Completed multimedia product can be burned/copied and used to create professional music and video compilations.

When using the video studio mode, the virtual workstation can transfer video from camcorders, VCR's, web-cams, computers and other devices to provide content to the interface for editing and the like. The video studio allows a student to easily edit video by dragging and dropping video clips and audio transitions and effects to create movies and/or other presentations. The video studio also allows students to save edited video to storage media, the web, or burn to a CD or DVD. The student can also choose to create or edit a movie using a screenplay developed by another student(s) when permissions are obtained.

The virtual workstation can also be configured to provide a professional CD j-card and jewel-case workstation or as an art designer workstation. Additionally, the virtual workstation can also be configured as a professional virtual dance-design workstation.

The virtual workstation also allows multiple remotely located students and users to engage in collaborative efforts to create multimedia product.

The video studio can also be used to create a personalized multi-media Digital Resume Presentation and Video Multi-Media Skills Project Portfolio (hereinafter referred to as a "digital resume") for the student. A digital resume is a multimedia presentation that is a personalized representation of a students resume. The digital resume can also include multimedia product that is prepared by the student. The multimedia product can be tailored to the students experiences to link viewers to personal websites, email, computer programs, and completed multimedia products. It is preferred that when preparing the digital resume, the student tailor the multimedia product to subject matter related to their experience and skills, marketability, and multimedia products specifically designed to attract a particular employer's interest.

The digital resume preferably allows potential employers to view the student using their skills, to view digital cover pages directed to student's career interests, and to view multimedia products completed by the student. The digital resume allows students to accompany their video with their own audio edited voice narration to create a personal effect. The virtual workstation will preferably provide themes (useful audio and video clips) that can be modified depending on the particular career interest of the student. For example, suitable footage and clips will be provided for those interested in pursuing science and medicine. Likewise, themes will also be provided for those interested in a an entertainment career.

These career selected themes will also be aligned with a specific users educational objectives. The digital resume portfolio project presentation data when burned/copied to storage media can include digital completed multimedia products and technology projects (such as computer programs, developed web sites, or the like).

When the interface is set in music studio mode, the student can choose to create, produce, and edit digital audio data to create a professional music compilation. By utilizing the virtual workstation's music studio tools, students can produce, edit, record, develop, and save melodies, songs, instrumentals, vocals, and song-by-song data until they have produced a complete song(s) with lyrics. The musical multimedia product can be saved regardless of the length of the audio data.

When using the virtual workstation the student can configure the workstation to edit, produce/create audio and video data. This digital data can be later burned/copied to storage media. For the most part any data that is created with the virtual workstation when the virtual educator is active at different points throughout the student's access to the virtual workstation requires that the student use an equal amount of effort to solve projects as to create multimedia products. When the virtual workstation is used to create video and audio data that is burned/copied to storage media, this data can preferably be read on virtually any audio or video player/computer.

As is clear from the above disclosure, the virtual workstation allows students access to professional caliber audio and video production equipment along with instructions and help features to help the student master the various tools. By allowing students conditional access to such powerful entertainment tools, the virtual workstation creates an incentive for the student to complete educational projects that further the student's education.

The virtual workstation also includes a finalization feature that can be selected when students save their multimedia product to the storage media. Once the student has saved the multimedia product and selects to finalize the stored multimedia product, the virtual workstation will automatically burn/copy not only the existing saved multimedia product data, but also an encoded serial numerical/text password that may be associated with the student.

When a CD or DVD is encoded with this serial numerical/text password, the data cannot be copied without permission. There are two types of CD/DVD finalization processes that may be selected by the student. The first type of CD/DVD finalization process transfers data normally so that copying is freely permissible. The second type of finalization process uses CD/DVD content piracy protection encoding. When the second type of finalization process is selected, normal CD-to-CD and DVD-to-DVD copying cannot be satisfactorily completed.

When a music audio-CD or a video-DVD is encoded with a serial numerical/text combined encoded password the CD/DVD will play normally and will also serve as a key to access the virtual workstation system website (hereinafter referred to as the "website"). When a protected multimedia product is used to access the website, the website can provide a CD/DVD management duplication/registration console that manages a user(s) capability to copy/duplicate finalized piracy protected CD or DVD. The website also provides an on-line artist entertainment exhibition/tournament site configured to enable participants to post entertainment related multimedia products. It is preferable that the website will not allow users to submit multimedia products that were not designed and completed with the virtual workstation.

The management CD/DVD duplication console (hereinafter referred to as the "duplication interface") preferably prompts students and other users to insert a virtual workstation password-encoded music audio CD, audio-E-CD, digital video versatile disc, or video-E-DVD into the user(s) CD- or -DVD-ROM before the user can gain access to the duplication interface. Once the virtual workstation encoded CD or DVD is entered into the CD- or -DVD-ROM drive, the website's security server will authenticate the CD or DVD and allow the user to enter the duplication console.

Once a user(s) automatic Internet site login is successful the user(s) must select between proceeding to the duplication console area or the competition area of the website. When the user chooses the duplication console the user can activate a copying process that overcomes the piracy encrypted protection. First, the user is preferably prompted to verify whether the correct CD or DVD is inserted into the DVD/CD-ROM drive. Once the CD or DVD that is to be duplicated has been inserted into the appropriate drive, the website's server retrieves the encrypted serial code and inserts that serial code on a user duplication registration form that the user must fill out before continuing the duplication process.

The digital registration form that is presented to the user contains the particular encrypted serial key-code in a key-code box located on the digital registration form. The encrypted serial key-code in the key-code box is represented by variables to avoid exposing the code to the user. When the server receives the completed registration form, the server obtains the user information, such as: name, address, and zip code.

Once the digital registration form is submitted the website's server updates the user(s) driver information to allow that specific piracy protected CD or DVD to be decoded and duplicated. Limitations on the number of copies or on the number of free copies can be made by the website. Once the free copy limit is reached, subsequent duplications will require payment of a fee.

If a connection with the website is lost or not established or a digital registration form is not submitted the automatic user's driver update will be aborted. By aborting the update process duplication is prevented and the user will be logged off of the website.

Using this encrypting/embedding serial code method for protecting CD/DVD content, consumers of commercially distributed CDs, DVDs and other related storage media will be restricted from reduplication of commercial CDs, DVDs, and other similar digital storage media content.

When a user attempts to copy the content of a duplication protected encoded music CD or video DVD, the copy device's laser will read the data/information and "hidden" encoded data that is to be duplicated from the protected CD or DVD media. The duplication device's laser will attempt to replicate the CD or DVDs complete information by burning/copying this information and "hidden" encoded data to CD or DVD. The "hidden" encoded data/embedded code will define index points in the subcode of each CD music audio track, video track, and error correcting coding or subsequent data that instruct the duplication device's laser after burning/copying the information to re-burn specific points on the CD or DVD. Such additional re burn points will cause playback reading errors that protect the information by preventing full reduplication of the CD or DVDs content.

By allowing students to protect their multimedia products, the virtual workstation helps prevent students from being taken advantage of by unauthorized duplication of their work.

Referring to FIG. 2, one embodiment of the method of the present invention operates as follows. During steps one through five, a student selects a virtual workstation icon on a computer system which causes the computer to connect to the virtual workstation system. The student is then preferably prompted to enter a login identification and password that is associated with his or her personal profile. The network then determines if the information entered by the student is valid. If the student enters invalid information the computer will then cease its attempt to connect to the virtual workstation system and possibly provide the user with additional attempts to enter a valid login and password. If the student enters valid information then the network allows the student's computer to connect to the system's virtual private network. Once connected to the virtual workstations virtual private network, the student is preferably prompted to select a career development area from lists of career options. Once a career interest is selected, the virtual workstation provides a short video about careers and professions that relate to the particular career selection.

During step six, the student is then prompted to select one of the music studio and video studio modes.

During step seven it is determined whether this is the student's first time accessing the virtual workstation. If it is the student's first time accessing the virtual workstation, then the virtual educator will administer diagnostic tests before the virtual workstation becomes available to the student. When the student has completed the diagnostic test, the virtual workstation becomes available to the student. If it is determined that this is not the first time that the student has logged into the system, then the virtual workstation will become immediately available for student operation.

As the virtual workstation becomes available for student interaction the virtual educator will preferably simultaneously access that specific student's profile from previous occasions. The software program then utilizes the profile information to pinpoint the students academic weaknesses. Once the predetermined interval has elapsed, the virtual educator will access databases containing projects and present the student with those projects suitable for trying to remedy the student's area of academic weakness.

It is preferred that a student's specific area(s) of academic weakness are constantly monitored and tracked by the virtual educator and updated with quarterly diagnostic testing. The quarterly diagnostic tests can also be used to evaluate a users learning ability, level of educational achievement, and educational areas of difficulty. Additionally, the virtual educator can select some projects to test whether a student is color blind, suffering from dyslexia, or suffering from another learning handicap. This is done by providing projects that are colored or presented such that students with certain disabilities are liable to answer in a particular manner. This allows the virtual educator to flag a student for follow up by teachers and/or parents to determine whether treatment or special attention is warranted.

During step eight, the virtual workstation becomes available for total student operation. This allows the student to develop multimedia products and digital resumes.

During step nine, the student's access to the virtual workstation is suspended by a window containing a project selected by the virtual educator. The projects that are selected from databases that contain educational project data. Each project interrupts the student's access to the virtual workstation at a predetermined interval. The projects are relevant educational problems that focus on building the knowledge and skills that are deficient in a student. The project can be set to have a time limit for the student to answer. Once the student has successfully completed the project, the student can again access the virtual workstation for multimedia production.

Steps eight and nine are preferably repeated throughout the entire time that the student remains logged in to the virtual workstation. If a student finds that an educational task is too difficult the user may choose to request assistance from other students that are currently logged into the virtual workstation system. A student may also be able to request hints from the virtual educator when a project is too difficult to complete. The project hints may be limited based on a number of criteria, such as: number of previous requests for hints; recent increase in difficulty of projects by virtual educator; amount of improvement in student diagnostic scores; ratio of projects completed without requesting help from system of students relative to those projects on which peer help was sought or a hint requested.

The storage media on which multimedia production is saved can be used to enter tournaments that can be held on line to enable participants to display projects for talent competitions and exhibition. For users interested in the competition site that do not have virtual workstation CD or DVD to use as a key website entrance, the user(s) can enter their email address into the website to receive a temporary contestant login Id and password to access the competition site.

When the temporary user initially accesses the website there will preferably be a disclaimer that must be accepted by the user before continuing. Once the user has accepted the disclaimer the user must then vote on three contestants other than themselves in any of the entertainment competition categories. When this is done the user will be presented with a digital competition rule and guideline form that also must be accepted before proceeding.

As a user accepts the rules and guidelines of the competition the next step will be to fill out a digital application to be submitted with a registration fee. After all these step have been completed the user(s) are then presented with a contestant digital dashboard with tools for uploading/posting contestant talent files, deleting files, finding their contestant rank/status, and receiving/sending contestant email. The contestants' dashboard email will automatically contain a new email with a permanent login Id/password.

There are preferably six categories of competition: music entertainment, acting, modeling, art, and sports entertainment. Six winners can be chosen each quarter and those winners will be sent a letter and/or gift. It is preferred that each contestant winner letter include an invitation for a final showcase at the end of the year for all twenty-four contestants to compete for a grand prize. Successful entertainers presently working in the entertainment industry will judge the winners present at the final showcase.

The present invention can employ methods that directly focus on an array of developmental technologies, solutions, and services that connect the broad scope of "Entertainment" with that of the more isolated field of "Education". Fundamentally, these developments of technology, solutions, and services will serve as educational solutions that can be used by grades K through 12 and higher educational institutions. Moreover, the present invention also incorporates technological developments in the area of CD/DVD copyright-protection and piracy-protection in the form of methods, services, modules, solutions, and apparatuses.

One embodiment of the method of the present invention operates as follows. The method includes: providing a workstation configured to access multimedia tools (which may be located on the workstation, a server, or on a website); preferably testing the person to determine a current educational level; allowing the person to access the multimedia tools via the workstation to generate multimedia product; interrupting the person's access to the multimedia tools at a predetermined interval; providing at least one educational project that must be completed by the person to reestablish access to the multimedia tools; evaluating the completed educational project (using any desired criteria, such as completion time, accuracy, writing level, etc.); storing the evaluation in a personal profile corresponding to the person (which can be kept in an electronic file on the workstation, server, or website); and using the personal profile to select the next educational project to be assigned during an interruption of the person's access to the multimedia tools (this can be a rigid algorithm that simply increases or decreases difficulty based on a prior evaluation (s) or can include a program that mimics artificial intelligence or uses artificial intelligence components).

The method preferably includes the steps of interrupting access to multimedia tools (i.e., to the tools described above in conjunction with the video studio, music production studio, design studio, etc.), providing the at least one educational project, and evaluating the completed project are automated.

The method preferably includes the multimedia tools being maintained on a server or website that is in communication with the workstation. The method also preferably includes providing multiple workstations attached to the server or website to allow collaboration between two or more people to develop a common multimedia product using the multimedia tools. Report detailing the person's progress can be sent via email or automatically printed and mailed.

The method preferably includes selecting whether to access the multimedia tools via a video studio graphical user interface or a music studio graphical user interface. The multimedia product can be submitted to the server or website for evaluation.

Marketing agreements can be arranged for multimedia product with at least some of the profits preferably being used to fund a charity or the program operating the method of the present invention. The multimedia product can be submitted by uploading the multimedia product to a website.

The method may include operating the workstation by the person to select a potential area of career interest and providing information via the workstation about careers that relate to the potential area of career interest. Testing the person via the workstation for learning disabilities can also be performed by the method of the present invention.

Another embodiment of the present invention operates as follows. The method of educating a person is performed by an apparatus having a workstation configured to access multimedia tools. The apparatus can be the workstation with the appropriate software therein or can be a server, a remote server, a website, or the like. The automation of the method allows for wider use of the method of the present invention and makes it easier for poor schools to have sophisticated learning and creativity tools without having to hire extra instructors. For example, the apparatus can be a workstation that is connected to a website on which the multimedia software is stored to provide the multimedia tools (i.e., the modules and tools necessary to make the above described multimedia product and to perform the above described multimedia functions). The method includes: allowing input by the person to access the multimedia tools via the workstation to generate multimedia product; allowing input by the person to select whether to access the multimedia tools via a video studio graphical interface or a music studio graphical user interface; automatically interrupting the person's access to the multimedia tools at a predetermined interval (as described above, the interval can be regular or irregular and can be based on various criteria); providing at least one educational project via the workstation that must be completed by the person to reestablish access to the multimedia tools; evaluating the completed educational project based on accuracy and/or completion time; and storing the evaluation in a personal profile corresponding to the person.

The method of present invention may include the apparatus sending a report detailing at least a portion of the person's evaluation via email or via a print out that is mailed or the like. This allows teachers and educator assistants to obtain valuable feedback. The apparatus preferably allows input by the person to select a potential area of career interest (such as law, medicine, accounting, social services, banking, etc.) and provides information via the workstation about careers that relate to the potential area of career interest.

Testing the person via the workstation for learning disabilities may also be performed. This allows the early spotting of learning disabilities in poorer schools where such disabilities may go undetected longer for a variety of social reasons. Multiple people may be able to access the multimedia tools through multiple workstations to allow collaboration between at least two people to develop a common multimedia product.

It is recognized by those skilled in the art that changes may be made to the above described embodiment of the system and method for educating without departing from the broad inventive concept thereof. It is understood, therefore, that this invention is not limited to the particular embodiments disclosed, but is intended cover all modifications which are within the spirit and scope of the invention as defined by the appended claims and/or shown in the attached drawings.

What is claimed is:

1. A method of facilitating interest in the arts and facilitating preparation of a portfolio of creative work in the form of a digital resume which is adapted for use in applying for positions in the entertainment industry while attempting to foster an interest in education, the method being automatically performed by an apparatus including a virtual workstation configured to access multimedia tools, the method comprising:

allowing input by the person to access the multimedia tools via the virtual workstation, the multimedia tools comprising a music sequence editor and a video sequence editor configured to facilitate the creation of an original digital composition;

allowing input by the person to select whether to access the multimedia tools via a video studio graphical user interface or a music studio graphical user interface;

allowing the person to access the virtual workstation to generate the original digital composition based on the creativity of the person;

requiring that the person complete at least one educational project to continue accessing the virtual workstation to generate the original digital composition;

storing the original digital composition on a storage media to create at least a portion of a digital resume adapted for use in applying for entertainment related positions, the digital resume comprising subject matter related to the person's academic performance, experience, skills, and marketability.

2. The method of claim 1, further comprising the step of automatically generating the at least one educational project based on information about the person's educational level stored in a personal profile.

3. The method of claim 1, further comprising the step of providing diagnostic tests to the person prior to granting initial access to the virtual workstation.

4. The method of claim 1, further comprising the step of the virtual workstation providing one of a music studio, a video studio, a design studio, a fashion studio, and an art studio.

5. The method of claim 1, further comprising the step of testing the person via the workstation for learning disabilities.

6. The method of claim 5, further comprising the step of using the storage media to access a website to obtain permission to copy the original digital composition to encourage the protection of ownership rights in the original digital composition when the storage media had been provided to another as the digital resume.

7. The method of claim 1, further comprising using a virtual educator to analyze the completion of the at least one educational project.

8. A method of facilitating the preparation of a portfolio in the form of a digital resume which is adapted for use in applying for positions in an entertainment industry while attempting to encourage education, the method being performed automatically by an apparatus comprising a workstation configured to access multimedia tools, the method comprising:

allowing input by the person to access the multimedia tools, the multimedia tools comprising a music sequence editor and a video sequence editor configured to facilitate the creation of an original digital composition;

testing the person to determine a current educational level;

allowing the person to access the multimedia tools via the workstation to generate the original digital composition;

allowing input by the person to select whether to access the multimedia tools via a video studio graphical interface or a music studio graphical user interface;

interrupting the person's access to the multimedia tools at a predetermined interval;

providing at least one educational project that must be completed by the person to reestablish access to the multimedia tools;

allowing access to the multimedia tools by the person to facilitate the creation of an original digital composition by the person based on the creativity of the person;

storing the original digital composition on a storage media to create at least a portion of a digital resume adapted for use in applying for entertainment related positions, the digital resume comprising subject matter related to the person's academic performance, experience, skills, and marketability.

9. The method of claim 8, further comprising the steps of:

operating the workstation by the person to select a potential area of career interest; and providing information via the workstation about careers that relate to the potential area of career interest.

10. The method of claim 9, wherein the step of providing a workstation further comprises the multimedia tools being maintained on a server that is in communication with the workstation.

11. The method of claim 10, further comprising providing multiple workstations attached to the server to allow collaboration between two or more people to develop a common multimedia product using the multimedia tools.

12. The method of claim 10, further comprising sending a report detailing the person's progress via email.

13. A method of educating a person adapted to facilitate the person's advancement or entry into an entertainment industry, the method being automatically performed by an apparatus having a workstation configured to access multimedia tools, comprising;

allowing input by the person to access the multimedia tools via the workstation to generate an original digital composition, the multimedia tools comprising a music sequence editor, a video sequence editor, and a plurality of virtual musical instruments, the multimedia tools being configured to facilitate the creation of the original digital composition;

allowing input by the person to select whether to access the multimedia tools via a video studio graphical interface or a music studio graphical user interface;

allowing access to the multimedia tools by the person to facilitate the creation of the original digital composition by the person based on the creativity of the person, ownership rights in the original digital composition being vested in the person;

automatically interrupting the person's access to the multimedia tools at a predetermined interval;

providing at least one educational project via the workstation that must be completed by the person to reestablish access to the multimedia tools;

evaluating the completed educational project based on accuracy and/or completion time;

storing the evaluation in a personal profile corresponding to the person;

storing the original digital composition onto a storage media to create a digital resume for use in applying for entertainment related positions, the digital resume comprising subject matter related to the person's academic performance, experience, skills, and marketability.

14. The method of claim 13, further comprising the step of testing the person via the workstation for learning disabilities.

15. The method of claim 14, further comprising the step of presenting the original digital composition for evaluation.

16. The method of claim 15, further comprising the step of arranging a marketing agreement for the original digital composition with at least some of the profits used to fund a charity.

17. The method of claim 15, wherein the step of presenting further comprises submitting the original digital composition by uploading the original digital composition to a website.

18. The method of claim 13, further comprising the step of testing the person via the workstation for learning disabilities.

19. The method of claim 13, further comprising allowing a plurality of people to access the multimedia tools through a plurality of workstations to allow collaboration between the people to develop a common multimedia product.

\* \* \* \* \*